Sept. 6, 1932.  A. H. GFRORER  1,876,219
INDUSTRIAL TRUCK
Filed July 31, 1930   6 Sheets-Sheet 1

Inventor
Albert H. Gfrorer
By Popp and Powers
Attorneys

Sept. 6, 1932.  A. H. GFRORER  1,876,219
INDUSTRIAL TRUCK
Filed July 31, 1930  6 Sheets-Sheet 4

Inventor
Albert H. Gfrorer
By Popp and Powers
Attorneys

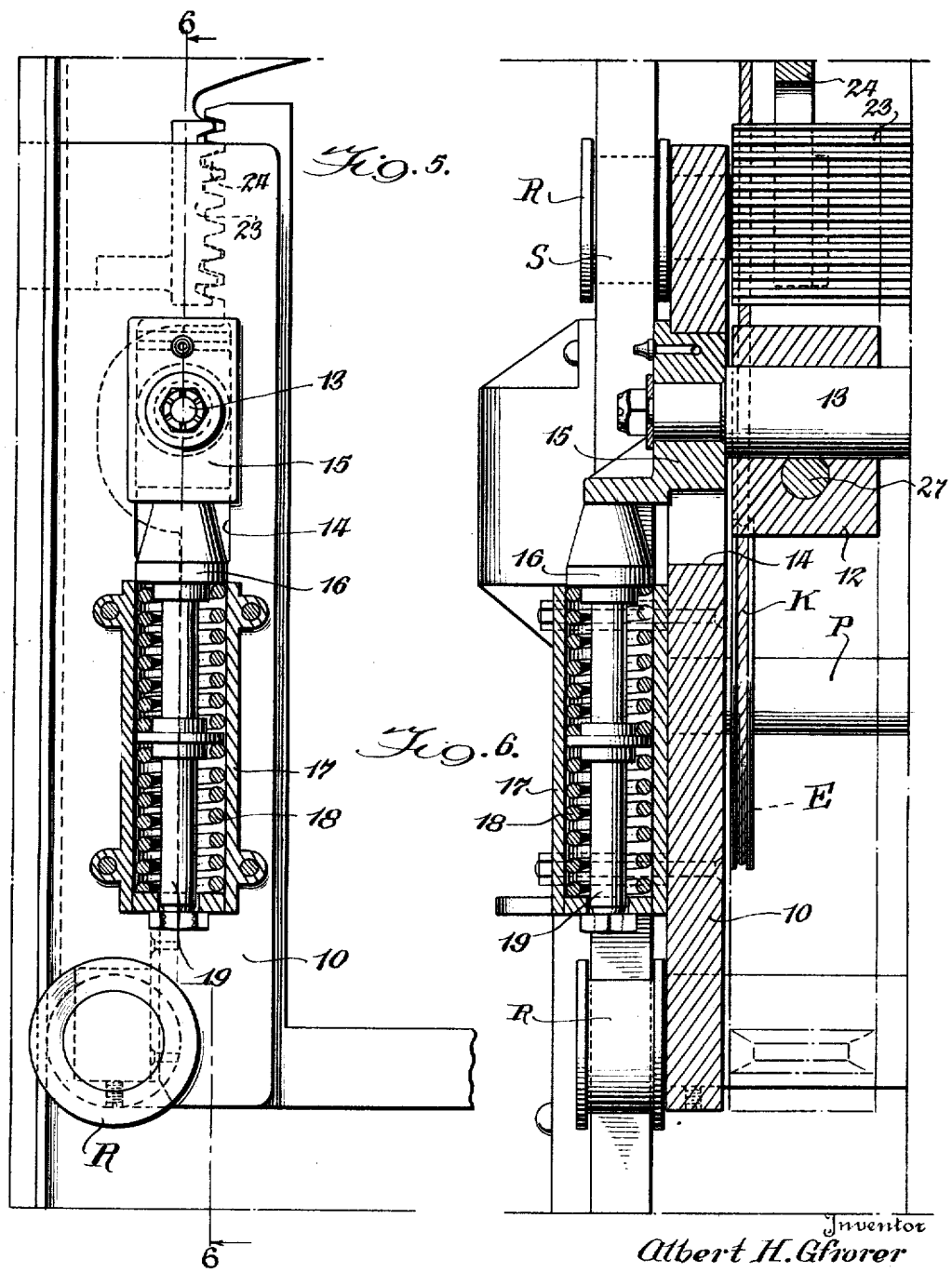

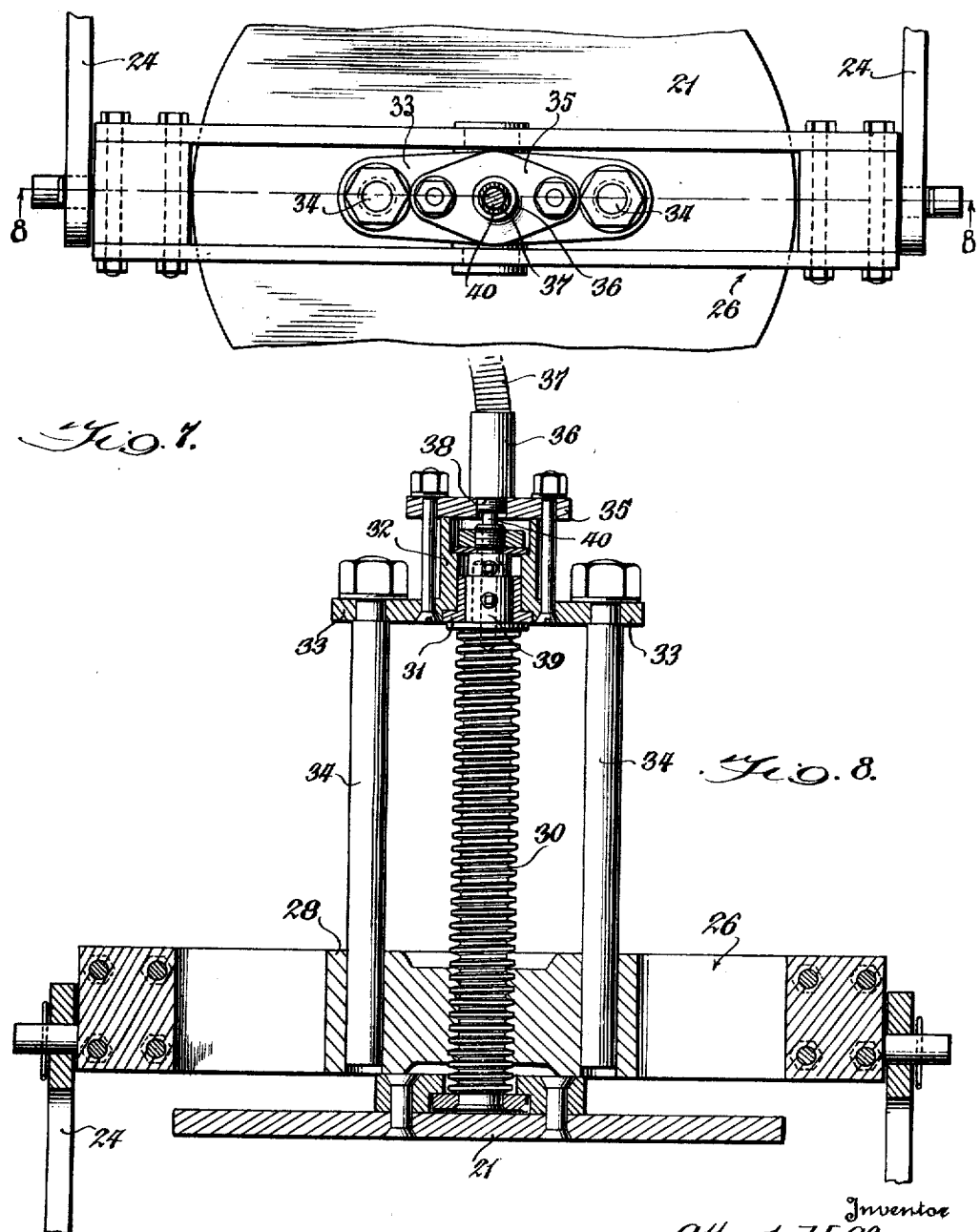

Patented Sept. 6, 1932

1,876,219

UNITED STATES PATENT OFFICE

ALBERT H. GFRORER, OF BUFFALO, NEW YORK, ASSIGNOR TO THE AUTOMATIC TRANSPORTATION COMPANY, INC., OF BUFFALO, NEW YORK, A CORPORATION OF NEW YORK

INDUSTRIAL TRUCK

Application filed July 31, 1930. Serial No. 472,060.

The invention relates to handling and conveying apparatus and more particularly to improvements in load engaging and holding mechanisms therefor.

Novel features of construction are proposed which are especially intended for, although not necessarily limited to, industrial trucks of the tiering lifting type wherein the load support may be raised to any desired elevation within its maximum limits of movement.

One object of the invention is to provide a load engaging and holding mechanism which co-operates with the load support of the truck with which it is associated to engage the load and prevent it from slipping from the said support during travel of the truck over rough or uneven surfaces, this object contemplating the automatic operation of said engaging and holding mechanism by the weight of the load.

A further object is a mechanism of the kind generally described which is adjustable at will to enable accommodation of loads of varying dimensions.

The invention is illustrated in the accompanying drawings in which:—

Figure 5 is an enlarged detail view showing in section one of the housings containing the resilient means by which the load supporting elements are normally held in a load receiving position.

Figure 6 is a section taken along line 6—6 of Figure 5.

Figure 7 is a fragmentary section showing in plan the top of the adjustable load engaging element and is taken along line 7—7 of Figure 2.

Figure 8 is a section taken along line 8—8 of Figure 7.

Figure 9 is an enlarged detail section of the operating end of the adjusting means for the load engaging element.

The invention may be applied to a truck of any suitable construction but it is particularly applicable to industrial trucks of the tiering lifting type. Such trucks are frequently employed in handling sheet metal and for moving it from point to point. It is the practice to handle the sheet metal in packs and due to the smooth surfaces of the sheets they tend to and would, unless otherwise prevented, slip from the load support of the truck during its passage over rough or uneven surfaces. In order to avoid shifting of the load upon the load support of the truck during transit the invention proposes in general a load engaging and holding mechanism which is operatively connected to the load support of the truck with which it is associated and which is adapted to be moved toward and engage the load as it is rested upon the said support, the weight of the load causing the operation of the load engaging and holding mechanism. As the load is rested upon a table or other suitable support at the point where it is to be removed from the truck, the engaging and holding mechanism returns to its normal position in which the load is unengaged, thereby permitting unloading of the truck as it moves away.

Figure 3:
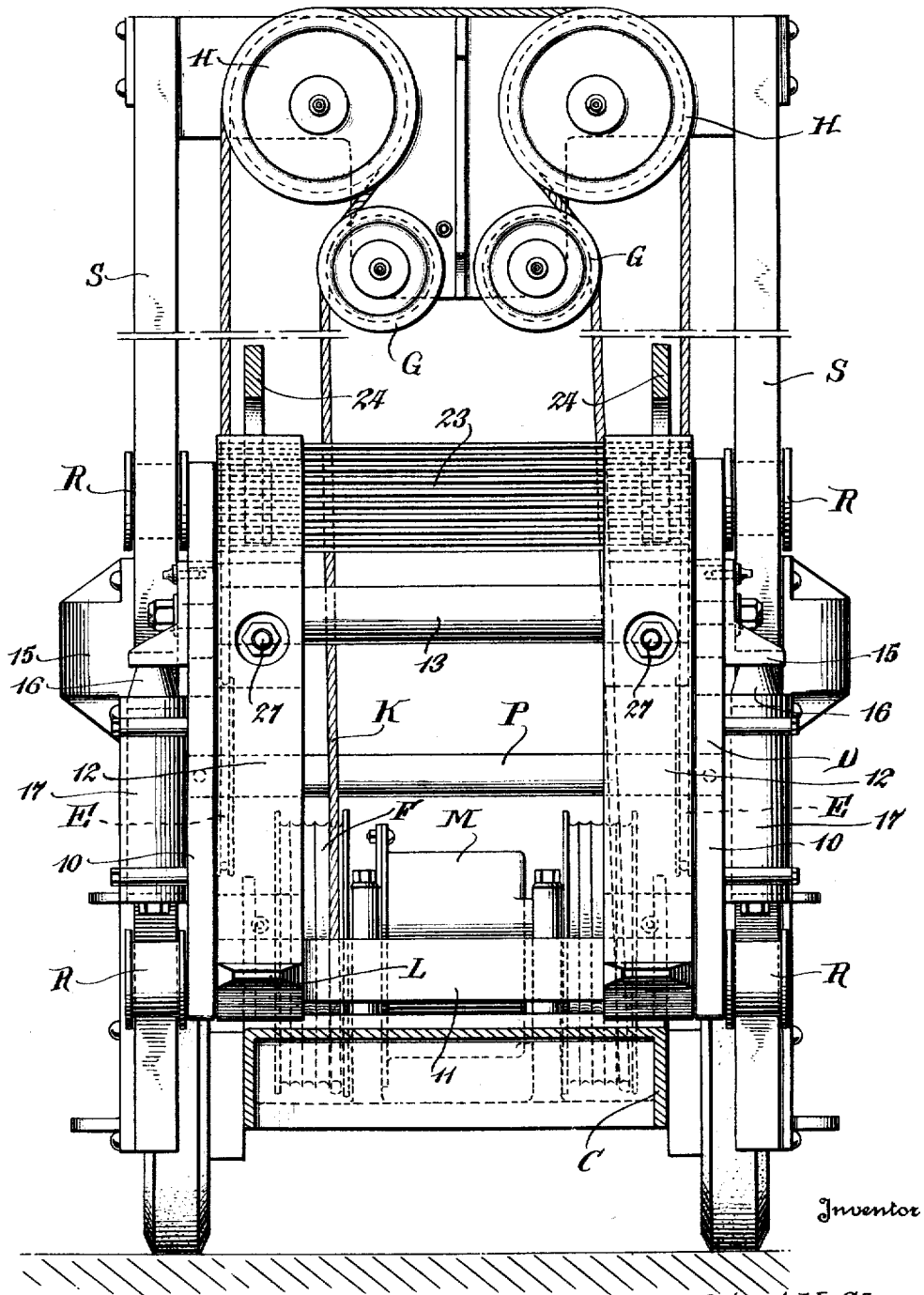
Figure 3 is a vertical transverse section taken along line 3—3 of Figure 2, the load support being shown in elevation.

The invention is illustrated in connection with an industrial truck T. The said truck includes a chassis C and a body B, the latter being formed at the load carrying end of the truck with guide standards S upon which a carriage D is mounted for vertical movement. The carriage D is provided with upper and lower guide rollers R which co-operate with opposite sides of the guide standards S in accordance with standard practice and it is designed to carry the load supporting elements L. The carriage D may be raised and lowered in any suitable manner. As illustrated, this is accomplished by means of a motor M (Figure 3) mounted upon the chassis C of the vehicle, the said motor being adapted to drive drums F. An operating cable K which is wound upon the drums F passes over sheaves G and H supported above the carriage D and beneath sheaves E mounted upon a shaft P the latter forming part of the carriage D. The lifting mechanism thus described forms no part of the present invention but is in accordance with general practice and hence this general description is sufficient for the purpose in view.

The carriage D which is raised and lowered as described includes side plates 10 which are secured at their lower ends by a cross bar 11 and intermediate their ends by the shaft P upon which sheaves E are mounted. The side plates 10 also carry the guide rollers R which are utilized in mounting the carriage D upon the guide standards S.

The load supporting elements L are mounted upon the carriage D and, as illustrated, comprise two L-shaped members formed with vertical legs 12. The said members are mounted between the side plates 10 of the carriage frame by their vertical legs upon a horizontal shaft 13 and at their lower ends the said legs rest against and are in sliding contact with the cross bar 11. The shaft 13, upon which the load supporting elements are mounted, extends between the side plates 10 and the ends thereof project through vertical guideways or openings formed in the side plates. Within the guideways 14 guide blocks 15 are mounted upon the ends of the shaft 13 and are adapted to permit vertical movement of the shaft 13 within determined limits. The blocks 15 extend beyond the outer faces of the side plates 10 and overlie plungers 16 which are mounted in tubular housings or cylinders 17, the latter being suitably secured to the side plates. The plungers 16 are normally held to project beyond the housings 17 by springs 18 and this despite the weight of the parts of the mechanism which is transmitted thereto through the blocks 15. The blocks 15 would, of course, unless otherwise prevented, move to the lower limits of the guideways 14 due to gravity. Thus the springs 18 serve normally to hold the shaft 13 at the upper limit of its range of movement. The said springs, however, are designed to yield upon a load being rested upon the load supporting elements to permit downward movement of the shaft 13 toward the lower limit of its range of movement together with the said load supporting elements.

The downward movement of the load supporting elements L, relative to the carriage frame, which results from a load being rested upon them, is availed of to effect movement of a load engaging member to engage and hold the said load to prevent it from accidentally sliding off of the load support. For this purpose the load supporting elements L are formed upon their vertical legs 12 with teeth 22 to provide gear racks which extend preferably from the upper ends of said legs. The teeth 22 of the load supporting elements L mesh with the teeth of a shaft-like pinion sector 23 which extends between and is connected to forwardly extending arms 24, the latter being pivotally mounted upon the shaft 25 which carries the upper guide rollers R of the carriage and carrying at their outer ends a load engaging member 21. The said member is preferably supported above the load support between the arms 24. The latter, therefore, are connected at their free ends by a cross head 26 which is designed to support the load engaging member 21 directly over the load. At this point it is to be noted that when there is no load on the load support the springs 18 maintain both the load supporting elements L and the load engaging member 21 at the upper limits of their movements, that is to say in a position to receive a load.

In the use of the truck, the load is placed between the load supporting elements L and the load engaging member 21. As the load is rested upon the supporting elements they, under influence of the weight of the load move downwardly relatively to the carriage frame against the action of the springs 18. This downward movement is transmitted through the gear rack portions of the load supporting elements L and the shaft-like pinion sector carried by the arms 24 to the load engaging member 21 which likewise moves downwardly to thereby engage and hold the load against movement, it being understood, of course, that the extent of downward movement of the load engaging member 21 is much greater than the downward movement of the load supporting elements. When it is desired to remove the load from the truck, it is preferably rested upon a table or the like thereby allowing the springs 18 to move the load engaging member and load supporting elements toward their normal positions with consequent disengagement of the load by the said engaging member. As the truck then moves away the said mechanism is, of course, carried with it. It will be apparent that as the load engaging member 21 is operated by the weight of the load, the degree of pressure which is brought to bear against the load is proportionate to the weight of the load.

Figure 4:
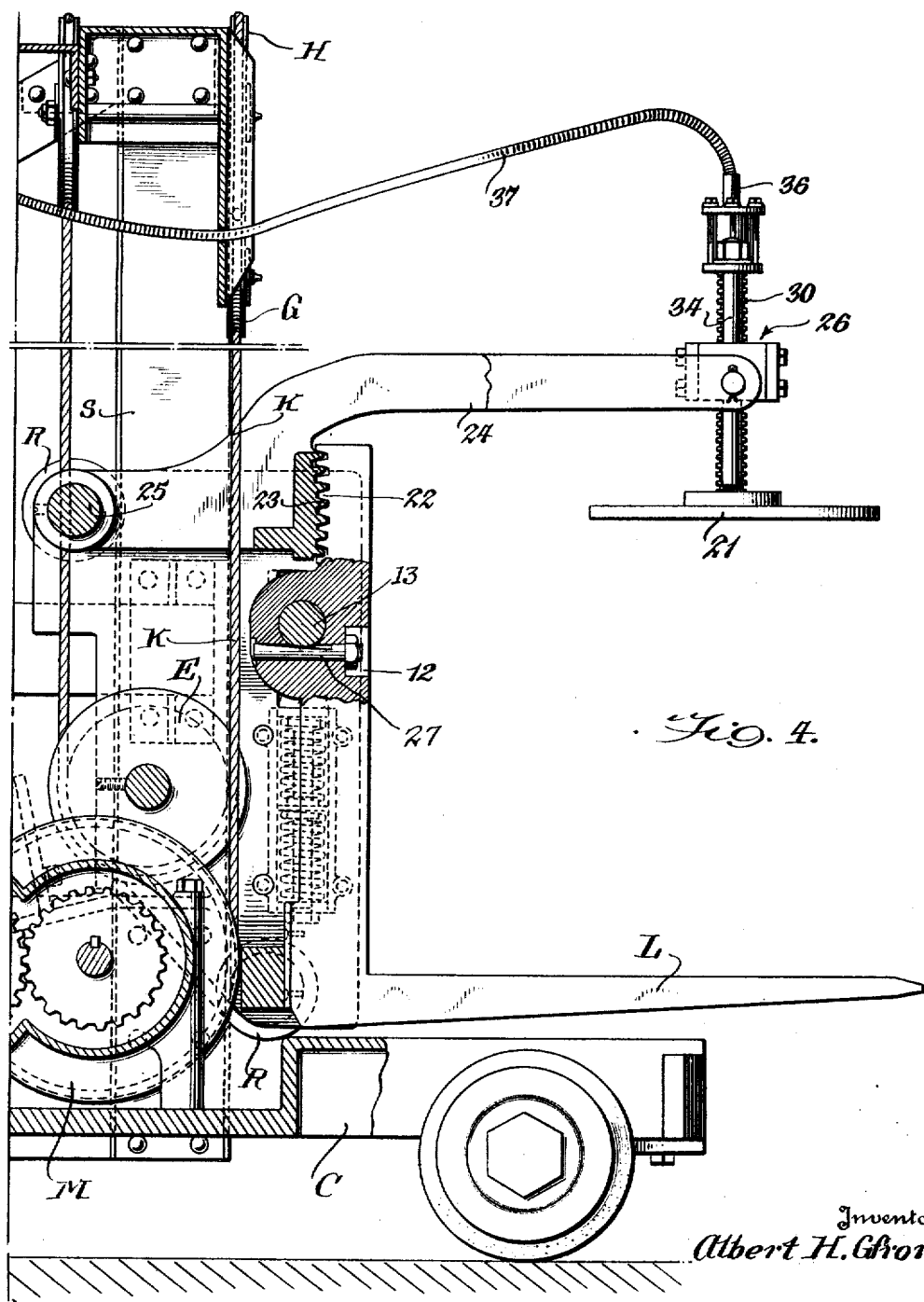
Figure 4 is a side elevation of the load carrying end of the truck somewhat similar to Figure 2, with parts of the load handling and associated mechanisms shown in section.

It is to be noted that the pinion sector 23 which is carried by the arms 24 is formed with teeth which extend the entire distance between the said arms to engage the toothed portions of all of the load supporting elements. This has the advantage that the load supporting elements L may be adjusted axially upon the shaft 13 between the side plates 10 so as to accommodate loads of different sizes without destroying the co-operating relation between the rack teeth of the load supporting elements and the teeth of the pinion sector. The elements 12 may be locked fast to the shaft 13 in the position desired in any suitable manner as by locking bolts 27 (Figure 4).

Figure 1:
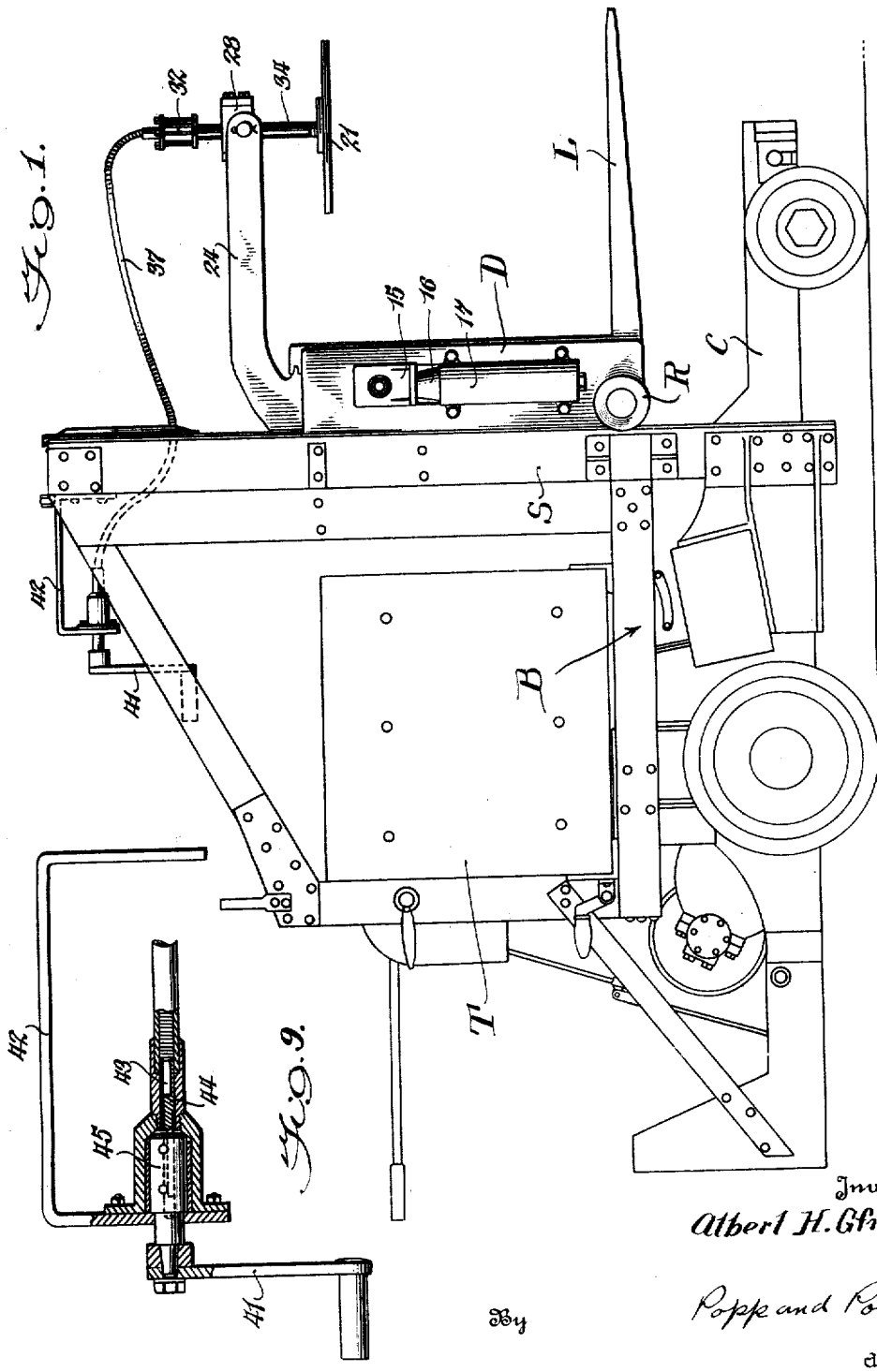
Figure 1 is a side elevation of a load handling mechanism embodying my invention as applied to an industrial truck.
Figure 2:
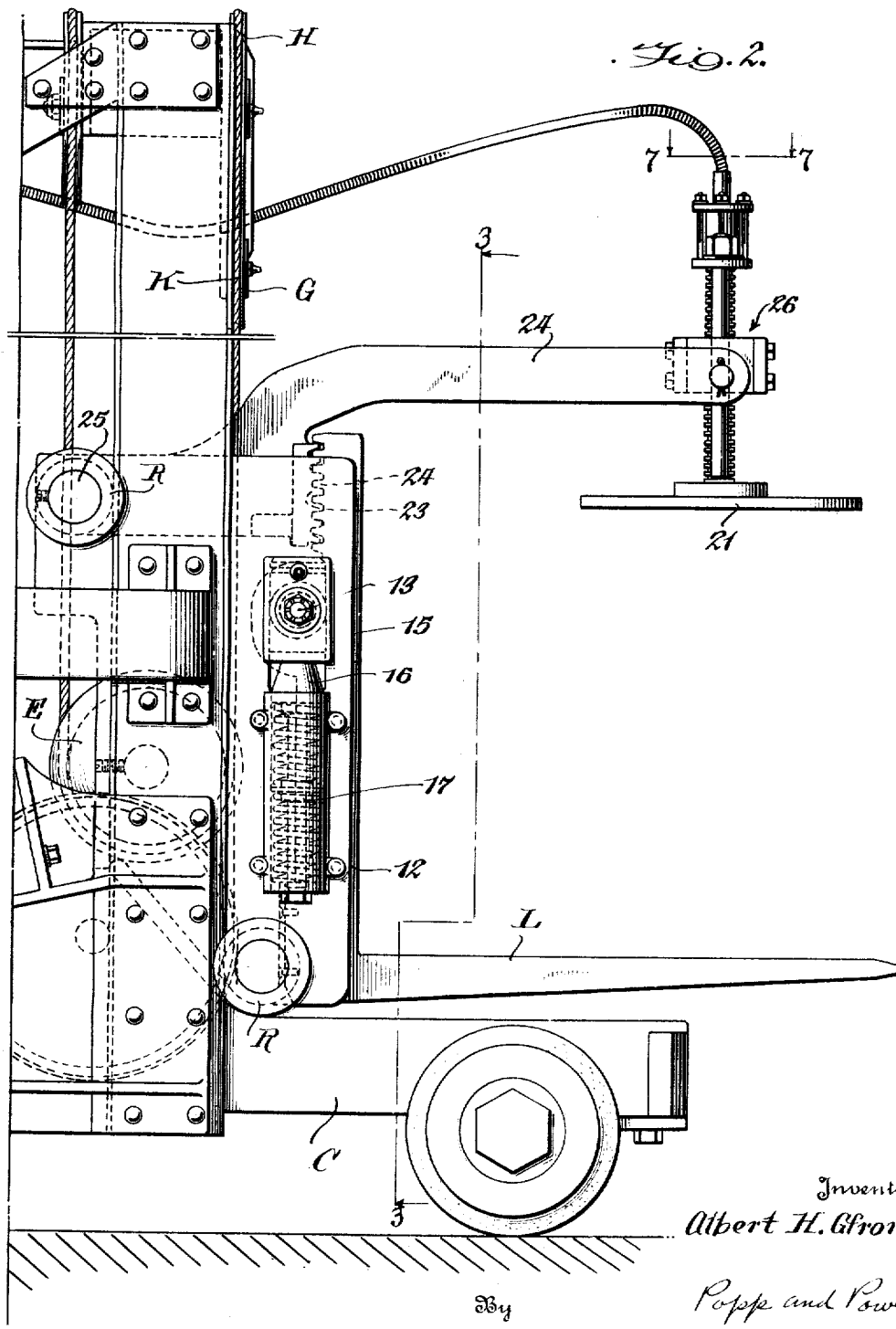
Figure 2 is an enlarged side elevation of the load carrying end of the truck and the load handling mechanism associated therewith.

Means is also provided whereby the normal position of the load engaging member 21 may be varied at will in order to accommodate loads of widely differing thicknesses. In this connection it is to be noted that while the load engaging and holding mechanism is operative without adjustment to accommodate loads of different sizes within a substantial range, the load engaging member 21 may be adjusted to greatly increase the range of utility. For this purpose, the cross head 26 carries a block 28 which is formed with a threaded opening through which an operating screw 30 extends, the latter having the load engaging member 21 secured to the end thereof for relative rotative movement. The upper end of the operating screw is journalled in a bushing 31 carried by a housing 32. The latter is formed at its bottom with an elongated flange 33. Bolts 34 are suitably secured to the said flanges to extend toward and project through suitable openings formed in the block 28. A top plate 35 is secured to the housing 32 in any convenient manner and the nipple 36 of the cable housing 37 is secured to the said plate by a threaded extension 38. The terminal portion 39 of the operating cable 40 is suitably secured to the operating screw 30. As best shown in Figures 1 and 9, the operating cable 40 may be operated by a hand crank 41 which is preferably secured by means of a bracket 42 to one of the guide standards S so as to be within convenient reach of the operator of the truck. At this end, the cable 40 is provided with a solid extension 43 which fits in a slot formed in a connecting element 44, the latter being keyed to the short rotatable shaft 45 to the outer end of which the crank 41 is fixed. By operating the handle the operator of the truck may regulate the normal position of the load engaging element 21 as desired and the housing 32 and bolts 34 prevent twisting of the cable housing 37. This construction has the advantage that adjustment may be made, if necessary, quickly and without the necessity of tools.

From the foregoing it will be apparent that the carriage with which the load engaging and holding mechanism is associated may be operated in the usual manner and that the said load engaging and holding mechanism is operative regardless of the position of the said carriage thereby insuring the load against shifting upon the load support during passage of the truck over rough or uneven surfaces, the said mechanism releasing the load as it is rested upon a table or the like arranged at its destination.

I claim as my invention:

1. The combination with a conveyor of a load supporting frame carried thereby, a cross rod mounted in said frame and having a range of movement relative thereto, a load supporting element carried by said cross rod, means at opposite ends of said cross rod for normally holding said cross rod away from the lower limit of said range of movement, a load engaging member and means connecting said member and said load supporting element whereby upon a load being rested on said supporting element it is moved downwardly to effect movement of the load engaging member to engage said load.

2. The combination with a conveyor of a load supporting frame carried thereby, a cross rod mounted to said frame and having a range of movement relative thereto, a plurality of load supporting elements carried by said cross road, resilient means at opposite ends of said cross rod for normally holding said cross rod away from the lower limit of said range of movement, a load engaging member and means connecting said member and said load supporting elements whereby upon a load being rested on said supporting elements they are moved downwardly to effect movement of the load engaging member to engage said load.

3. The combination with a conveyor of a load supporting frame carried thereby, a cross rod mounted to said frame and having a range of movement relative thereto, a plurality of load supporting elements carried by said cross rod, means at opposite ends of said cross rod for normally holding said cross rod away from the lower limit of said range of movement, a load engaging member, means connecting said member and said load supporting elements whereby upon a load being rested on said supporting elements they are moved downwardly to effect movement of the load engaging member to engage said load and means for adjusting said load supporting elements upon said rod to accommodate loads of different dimensions.

4. The combination with a conveyor of a load supporting frame carried thereby, a cross rod mounted to said frame and having a range of movement relative thereto, a load supporting element carried by said cross rod, resilient means acting against opposite ends of said cross rod and adapted to normally hold it away from the lower limit of said range, a load engaging member and means connecting said member and said load supporting element whereby upon a load being rested on said supporting element it is moved downwardly against the action of said resilient means to effect movement of the load engaging member to engage said load.

5. The combination with a conveyor of a load supporting frame carried thereby including side members, said members being formed with guideways, a cross rod extending between said side members and through said guideways, guide blocks carried by said cross rod, spring loaded plungers beneath said blocks in engagement therewith and adapted normally to hold said cross rod away from the lower limits of said guideways, a load supporting element carried by said cross rod, a load engaging member and means connecting said load engaging member and said load supporting element whereby upon a load being rested on said supporting element it is moved downwardly to effect movement of said load engaging member to engage said load.

6. The combination with a conveyor of a load supporting frame carried thereby including side members, said members being formed with guideways, a cross rod extending between said members and through said guideways, a load supporting element carried by said cross rod, means for normally holding said cross rod away from the lower limits of said guideways, a load engaging member and means connecting said supporting elements and engaging member whereby upon a load being rested on said supporting element it is moved downwardly to effect movement of said load engaging member to engage said load.

7. The combination with a conveyor of a load supporting frame carried thereby including side members having opposed guideways formed therein, a cross rod extending between said members and through said guideways, a load supporting element carried by said cross rod, teeth carried by said element, means for normally holding said cross rod away from the lower limits of said guideways, a load engaging member pivotally mounted upon said frame, a toothed element carried by said member adapted to mesh with the teeth carried by said load supporting element whereby, upon a load being rested on said supporting element the said element is moved downwardly to effect movement of said load engaging member to engage said load.

8. The combination with a conveyor of a load supporting frame carried thereby including side members having opposed guideways formed therein, a cross rod extending between said members and through said guideways, a plurality of load supporting elements carried by said cross rod, means for normally holding said cross rod away from the lower limits of said guideways, a load engaging member, means connecting said load supporting element and said load engaging member whereby upon a load being rested on said load supporting elements the load engaging element is moved to engage and prevent the said load from slipping from said load supporting elements, said supporting elements being adjustable so as to accommodate loads of different dimensions.

9. The combination with a conveyor of a load supporting frame carried thereby including side members having opposed guideways formed therein, a cross rod extending between said members and through said guideways, a plurality of load supporting elements carried by said cross rod, teeth carried by said elements, means for normally holding said cross rod away from the lower limits of said guideways, a load engaging member pivotally mounted upon said frame, a toothed element carried by said member adapted to mesh with the teeth carried by said load supporting elements whereby upon a load being rested on said supporting elements they are moved downwardly to effect movement of said load engaging member to engage said load.

10. The combination with a conveyor of a load supporting frame carried thereby including side members having opposed guideways formed therein, a cross rod extending between said members and through said guideways, a plurality of load supporting elements carried by said cross rod, teeth carried by said elements, means for normally holding said cross rod away from the lower limits of said guideways, a load engaging member pivotally mounted upon said frame, a toothed element carried by said member and in engagement with the teeth carried by said load supporting elements and adapted to permit their adjustment upon said cross rod whereby upon a load being rested on said load supporting elements they are moved downwardly to effect movement of said load engaging member to engage said load.

In testimony whereof I affix my signature.

ALBERT H. GFRORER.